Patented Feb. 10, 1942

2,272,498

UNITED STATES PATENT OFFICE 2,272,498

PROCESS FOR PRODUCING COMPOUNDS OF THE DIARYL SERIES

Werner Zerweck, Karl Schütz, and Heinrich Ritter, Frankfort-on-the-Main-Fechenheim, Germany, assignors to General Aniline & Film Corporation, New York, N. Y., a corporation of Delaware No Drawing. Application February 3, 1940, Serial No. 317,126. In Germany February 4, 1939

3 Claims. (Cl. 260—244)

Our present invention relates to a process for producing compounds of the diaryl series which consists in at temperatures corresponding at least to room temperature diazotizing a diazotizable amine of the aromatic or heterocyclic series at room temperature or above under substantially anhydrous conditions in an excess of an aromatic hydrocarbon or heterocyclic fundamental compound or derivatives thereof containing halogen or alkyl-, alkoxy- or aryl-oxy groups, or nitro- or carboxy groups or groups derived therefrom such as ester, amide, nitrile, aldehyde and ketonic groups, sulphone, sulphoxide and sulphonic acid groups and groups derived therefrom.

The diazotization may be performed either by introducing nitrous gases into a mixture of the diazotisable amine of the aromatic or heterocyclic series and the excess of the aromatic or heterocyclic compound acting as second reaction component or by producing the nitrous acid, which is necessary for forming the diazocompound, within the reaction mixture by adding thereto simultaneously or subsequently an alkali metal salt of nitrous acid and an acidifying agent, such as organic acids for example glacial acetic or formic acid, inorganic acids such as phosphoric or hydrochloric acid or salts or compounds of an acid reaction such as zinc chloride or sodium bisulfate or phosphorus oxychloride.

But advantageously such an acidifying agent is used which is miscible with the aromatic or heterocyclic compound acting as second reaction component.

While taking care to realize the aforesaid steps the amines are transformed into the corresponding diazo compounds and react in situ without being isolated with the second reaction component, which simultaneously is used as a diluent. Under the present reaction conditions the replacing of the diazo group by halogen, being an undesired by-reaction when separating the diazo compound, is absolutely excluded.

The present condensation reaction is applicable within a large scope.

As amines all of the diazotisable aromatic and heterocyclic amines are suitable, besides aniline the nuclear substituted primary amines of the benezen series, such as the toluidines, halogenated and nitrated anilines, the amines of the naphthalene, diphenyl- and anthraquinone series, of the carbazole series and the like. As second reaction component there may be used the aromatic hydrocarbons and heterocyclic fundamental bodies, such as benzene, toluene, the xylenes, diphenyl, naphthalene, thiophene, pyridine, quinoline and their derivatives, particularly the halogenated compounds, moreover compounds containing a negative substituent, such as nitrobenzene, nitronaphthalene, benzophenone, benzoic acid ester, phthalic acid anhydride, benzaldehyde and the like.

The compounds of the diaryl series, which were hitherto partly only difficultly, partly not accessible, but obtainable according to the present process within a large scope which could not have been foreseen, are partly new products. They are important intermediates for the production of dyestuffs and pharmaceutical products, while some of them are dyestuffs themselves.

In order to further illustrate our invention the following examples are given, the temperatures being in degrees centigrade.

*Example 1*

Into a solution of 24 parts of aniline in about 1000 parts of benzene a slow current of nitrous gases is introduced for some hours at room temperature and finally at about 50° C. When no more aniline can be detected the reaction liquor is extracted with a dilute caustic soda solution and then with water and the benzene is distilled off. The remaining diphenyl may be purified by distillation or recrystallization. It has the properties as described in literature.

When replacing benzene by quinoline and working otherwise in a similar manner as described above as the reaction product a phenylquinoline is obtained being a fluorescent oil, boiling under 12 mms, pressure at 200 to 205°

*Example 2*

To a solution of 93 parts of aniline in about 1000 parts of benzene 150 parts of sodium nitrite, and slowly during a period of some hours 150 parts of glacial acetic acid are added, and the mixture is stirred for some hours at room temperature. By steam distillation the excess of benzene and finally the formed diphenyl pass over.

When starting from 4-toluidine, 4-methyldiphenyl, when starting from 4-chloroaniline the 4-chlordiphenyl, and when starting from 4-nitraniline the 4-nitrodiphenyl is formed, all of the substance showing the properties described in literature.

*Example 3*

Into a solution of 41 parts of 3.4-dichloroaniline in about 1000 parts of nitrobenzene at room temperature nitrous gases are introduced. When the reaction has been finished the reaction mass is worked up as described in the foregoing example. The residue passes over at 9 mm. pressure at 215 to 225°. According to analysis probably a mixture of 2- and 4-nitro-3',4'-dichlorodiphenyl is obtained.

Example 4

22.3 parts of finely powdered 1-aminoanthraquinone are suspended in about 1000 parts of benzene and at 50° nitrous gases are introduced until no more aminoanthraquinone can be detected. Or one may heat the mixture up to the boiling point of benzene and remove constantly the reaction water by azeotropic distillation. Some impurities are removed by filtration and the liquor is extracted with a dilute caustic soda solution and water. Then the benzene is distilled off and the residue may be recrystallized for instance from acetic acid ester. In this manner 1-phenylanthraquinone exhibiting the properties described in literature is obtained with a good yield.

When starting in the same manner from 1.5-diamino-anthraquinone the 1.5-diphenylanthraquinone is obtained as clear yellow powder, which melts after recrystallization from trichlorobenzene at 337–338°.

The same 1-phenylanthraquinone is obtained when adding to the aforesaid suspension of 1-aminoanthraquinone in benzene at first 35 parts of sodium nitrite and slowly during some hours 35 parts of glacial acetic acid, stirring the reaction mass for about 10 hours at room temperature and for about 3 hours at about 50°.

When starting from 1-amino-5-chloroanthraquinone the 5-chloro-1-phenylanthraquinone of 179 to 180° melting point is obtained in the same manner. When starting from 1-amino-6-chloroanthraquinone the 6-chloro-1-phenylanthraquinone is obtained which crystallizes from chlorobenzene as light yellow crystals of 251° melting point.

Instead of glacial acetic acid one may use for instance formic acid or phosphoric acid or an acid acting salt such as sodium bisulfate or zinc sulfate in order to set free the nitrous acid. But advantageously such an acid or acid acting salt is used, which is miscible with the second reaction compound, i. e. benzene in this case.

Example 5

In the same manner as in the foregoing examples, into a suspension of 44.6 parts of 1-amino-anthraquinone in about 2000 parts of nitrobenzene nitrous gases are introduced while finally increasing the temperature to about 50°. The reaction product consists probably of a mixture of 2'- and 4'-nitro-1-phenylanthraquinone. By recrystallization from acetic acid anhydride one component of the mixture can be isolated as light yellow rhomboid plates melting at 263 to 265°.

Example 6

Into a suspension of 35 parts of finely powdered 1-amino-5-benzoylaminoanthraquinone in about 1000 parts of benzene at about 50° nitrous gases are introduced. When the reaction has finished, after cooling, the greater parts of the 1-phenyl-5-benzoylaminoanthraquinone obtained separates as a crystalline yellow powder. It may be purified by recrystallization from chlorobenzene and melts at 252 to 253° in a pure state.

The same 1-phenyl-5-benzoylaminoanthraquinone is obtained by diluting the aforesaid suspension of 35 parts of 1-amino-5-benzoylaminoanthraquinone with further 1000 parts of benzene, adding 35 parts of sodium nitrite and afterwards very slowly 35 parts of glacial acetic acid, stirring the mixture some hours at room temperature and finally at about 50°.

When saponifying the 1-phenyl-5-benzoylaminoanthraquinone obtained, for instance with sulfuric acid of 80% strength in the presence of glacial acetic acid, the 1-phenyl-5-aminoanthraquinone is obtained in the form of brick-red crystals which melt when recrystallized from benzine at 189 to 190°.

When starting from the same amount of 1-amino-4-benzoylaminoanthraquinone in the same manner as a yellow crystalline powder which melts at 260 to 261° C. the 1-phenyl-4-benzoylaminoanthraquinone is obtained.

Example 7

Into a solution of 85 parts of 3-amino-N-ethylcarbazole in about 2000 parts of benzene at about 50° nitrous gases are introduced, until no more initial carbazol compound can be detected. Some dark impurities are removed by filtration, the benzene solution is extracted with a caustic alkali lye and water, the benzene is expelled and the residue is fractionated. At 2–3 mm. pressure the 3-phenyl-N-ethylcarbazole passes over at the constant temperature of 232°. It melts at 125 to 126° and crystallizes from alcohol in the form of bright white prisms.

Example 8

Into a suspension of 80 parts of finely powdered 1.3.4-trichloro-7-aminophenoxazone(2) in about 2400 parts of benzene at 50 to 60° C. nitrous gases are introduced. When the reaction has been finished some water-insoluble impurities are removed from the red solution by filtration and the main part of benzene is distilled off. When cool the 1.3.4-trichloro-7-phenylphenoxazone(2) of the formula:

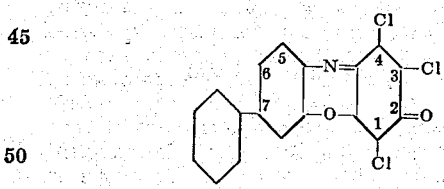

crystallizes as red crystals of 235° melting point. From the benzenic filtrate some further quantities of the reaction product can be isolated by evaporating the benzene and extracting the residue with alcohol. The part which is insoluble in alcohol may be finally recrystallized from tetrachloroethane.

When replacing benzene by toluene there is obtained a mixture of ortho- and para-7-tolyl-1.3.4-trichlorophenoxazone the less soluble ingredient of which melts at 263 to 264°. When using meta-xylene the reaction product melts at 238 to 239°, the reaction product derived from hydroquinone-dimethylether melts at 275 to 276°, that of meta-dichlorbenzene melts at 299 to 301°, that of anisol melts at 235 to 236°, the condensation with nitrobenzene yields a mixture of two products melting at 308 to 310° and 212 to 215° respectively. All these condensation products are reddish crystals.

The condensation of 6-amino-1.3.4-trichlorophenthiazone with benzene yields a reaction product melting at 278 to 280°, the condensation product of 7-amino-1.4-dichloro-3-(2'-chlorophenyl)-phenoxazone(2) and benzene is obtained as red crystals crystallizing from amylalcohol and melting at 246 to 247°.

We claim:

1. Process for producing compounds of the diaryl series, which consists in diazotizing a compound selected from the group consisting of diazotizable amines of the aromatic and heterocyclic series at temperatures ranging from room temperature to about 50° C. under substantially anhydrous conditions in an excess of a compound selected from the group consisting of compounds of the aromatic, pyridine and quinoline series containing a member of the group consisting of hydrogen, halogen, alkoxy-, nitro-, carboxy-, ketonic and sulfone groups, attached to the ring members.

2. Process for producing compounds of the diaryl series, which consists in diazotizing a diazotizable amine of the phenoxazone series at temperatures ranging from room temperature to about 50° C. under substantially anhydrous conditions in an excess of a compound selected from the group consisting of compounds of the aromatic, pyridine and quinoline series containing a member of the group consisting of hydrogen, halogen, alkoxy-, nitro-, carboxy-, ketonic and sulfone groups, attached to the ring members.

3. A process for producing 7-phenyl-1.3.4-trichloro-phenoxazone(2) of the formula:

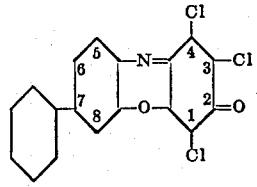

which consists in diazotizing 7-amino-1.3.4-trichloro-phenoxazone(2) at temperatures ranging from room temperature to about 50° C. in an excess of benzene under substantially anhydrous conditions.

WERNER ZERWECK.
KARL SCHÜTZ.
HEINRICH RITTER.